(12) United States Patent
Lee et al.

(10) Patent No.: US 11,417,897 B2
(45) Date of Patent: Aug. 16, 2022

(54) FUEL CELL VEHICLE

(71) Applicants: Hyundai Motor Company, Seoul (KR); Kia Motors Corporation, Seoul (KR)

(72) Inventors: Jong Jun Lee, Seongnam-si (KR); Ki Wook Ohm, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 43 days.

(21) Appl. No.: 17/162,384

(22) Filed: Jan. 29, 2021

(65) Prior Publication Data

US 2022/0085391 A1 Mar. 17, 2022

(30) Foreign Application Priority Data

Sep. 15, 2020 (KR) .................. 10-2020-0118363

(51) Int. Cl.
*H01M 8/04007* (2016.01)
*B60L 50/72* (2019.01)
*H01M 8/24* (2016.01)
*H02G 3/08* (2006.01)

(52) U.S. Cl.
CPC ......... *H01M 8/04037* (2013.01); *B60L 50/72* (2019.02); *H01M 8/24* (2013.01); *H02G 3/08* (2013.01); *H01M 2250/20* (2013.01)

(58) Field of Classification Search
CPC ....... H01M 2250/20; B60L 50/72; H02G 3/08
See application file for complete search history.

(56) References Cited

U.S. PATENT DOCUMENTS

| 8,235,732 | B2 | 8/2012 | Garascia et al. | |
|---|---|---|---|---|
| 2009/0183936 | A1* | 7/2009 | Kim | H01M 8/2465 180/68.4 |
| 2011/0111649 | A1* | 5/2011 | Garascia | H01M 50/543 337/414 |
| 2015/0323603 | A1* | 11/2015 | Kim | H02J 7/0063 702/58 |
| 2020/0369165 | A1* | 11/2020 | Yeon | H01M 8/0494 |

* cited by examiner

*Primary Examiner* — Adam A Arciero
(74) *Attorney, Agent, or Firm* — Slater Matsil, LLP

(57) ABSTRACT

A fuel cell vehicle includes a fuel cell and a junction box. The fuel cell includes at least one cell stack including a plurality of unit cells in a stacked configuration, heaters disposed at end portions of the at least one cell stack, current collectors disposed at the end portions of the at least one cell stack, a terminal block electrically connecting the current collectors and the heaters to the junction box, a positive bus bar and a negative bus bar electrically connecting the current collectors to the terminal block, and a positive wire and a negative wire electrically connecting the heaters to the terminal block. The junction box includes a first switching unit disposed between the positive wire and the positive bus bar, and a second switching unit disposed between the negative wire and the negative bus bar.

18 Claims, 18 Drawing Sheets

FUEL CELL VEHICLE

CROSS-REFERENCE TO RELATED APPLICATIONS

This application claims priority to Korean Patent Application No. 10-2020-0118363, filed on Sep. 15, 2020, which application is hereby incorporated herein by reference.

TECHNICAL FIELD

Embodiments relate to a fuel cell vehicle.

BACKGROUND

A fuel cell is a power generation device in which hundreds of stacked unit cells generate electricity. The generated electricity is collected in current collectors disposed at respective end portions of a cell stack, and is transferred to a junction box disposed at the upper end of the cell stack. To this end, the fuel cell includes a stack bus bar and a terminal block in order to transfer the electricity collected in the current collectors to the junction box.

The stack bus bar is a conductor that serves as an electrical path connecting the current collectors and the terminal block, and the terminal block is a component for transferring the electricity received from the current collectors through the stack bus bar to the junction box.

When an electronic component for operating a heater to generate heat and current collectors are short-circuited, if the supply of current to these components is not interrupted, the heater may overheat and thus burn.

SUMMARY

Accordingly, embodiments are directed to a fuel cell vehicle that substantially obviates one or more problems due to limitations and disadvantages of the related art.

Embodiments may provide a fuel cell vehicle that is electrically stable.

However, the objects to be accomplished by the embodiments are not limited to the above-mentioned object, and other objects not mentioned herein will be clearly understood by those skilled in the art from the following description.

A fuel cell vehicle according to an embodiment may include a fuel cell and a junction box configured to receive electric power generated in the fuel cell. The fuel cell may include at least one cell stack configured such that a plurality of unit cells is stacked, heaters disposed at end portions of the at least one cell stack to heat the at least one cell stack, current collectors disposed at the end portions of the at least one cell stack to collect electric power generated in the at least one cell stack, a terminal block electrically connecting the current collectors and the heaters to the junction box, positive and negative bus bars electrically connecting the current collectors to the terminal block, and positive and negative wires electrically connecting the heaters to the terminal block. The junction box may include a first switching unit disposed between the positive wire and the positive bus bar and a second switching unit disposed between the negative wire and the negative bus bar.

For example, the terminal block may include a positive bus terminal connecting the positive bus bar to a first end portion of the first switching unit, a positive heater terminal connecting the positive wire to a second end portion of the first switching unit that is opposite the first end portion, a negative bus terminal connecting the negative bus bar to a third end portion of the second switching unit, and a negative heater terminal connecting the negative wire to a fourth end portion of the second switching unit that is opposite the third end portion.

For example, the first switching unit may include a first fuse having one side connected to the first end portion and a first switch disposed between the opposite side of the first fuse and the second end portion.

For example, the second switching unit may include a second fuse having one side connected to the third end portion and a second switch disposed between the opposite side of the second fuse and the fourth end portion.

For example, the positive bus terminal and the negative bus terminal may be aligned in a first direction, and the positive heater terminal and the negative heater terminal may be aligned in a direction parallel to the first direction. Alternatively, one of the positive bus terminal and the negative bus terminal and one of the positive heater terminal and the negative heater terminal may be aligned in the first direction, and the remaining one of the positive bus terminal and the negative bus terminal and the remaining one of the positive heater terminal and the negative heater terminal may be aligned in a direction parallel to the first direction.

For example, the heaters may include a first heater disposed at one of the end portions of the cell stack so as to be connected to one of the positive wire and the negative wire and a second heater disposed at the opposite one of the end portions of the cell stack so as to be connected to the remaining one of the positive wire and the negative wire. The fuel cell may further include an intermediate wire disposed between the first heater and the second heater to connect the first heater and the second heater.

For example, the fuel cell may further include a third switching unit disposed in the path of the intermediate wire between the first heater and the second heater.

For example, the third switching unit may include a third fuse having one side connected to one of the first heater and the second heater and a third switch disposed between the opposite side of the third fuse and the remaining one of the first heater and the second heater.

For example, the at least one cell stack may include a plurality of cell stacks electrically connected to each other.

For example, the fuel cell may further include an intermediate bus bar disposed between the plurality of cell stacks to electrically connect the plurality of cell stacks to each other and an intermediate wire disposed between the plurality of cell stacks to electrically connect the heaters of the plurality of cell stacks to each other.

For example, the heaters may include a third heater connected to the positive wire, a fourth heater connected to the negative wire, and a plurality of fifth heaters disposed between the third heater and the fourth heater. The intermediate wire may include a first intermediate wire connecting the third heater and a $5\text{-}1^{st}$ heater, which is one of the plurality of fifth heaters, a second intermediate wire connecting the fourth heater and a $5\text{-}2^{nd}$ heater, which is another one of the plurality of fifth heaters, and a third intermediate wire connecting the plurality of fifth heaters to each other.

For example, the fuel cell may further include a fourth switching unit disposed in the path of the first intermediate wire, a fifth switching unit disposed in the path of the second intermediate wire, and a sixth switching unit disposed in the path of the third intermediate wire.

For example, the fourth switching unit may include a fourth fuse having one side connected to the $5\text{-}1^{st}$ heater and a fourth switch disposed between the opposite side of the fourth fuse and the third heater.

For example, the fifth switching unit may include a fifth fuse having one side connected to the fourth heater and a fifth switch disposed between the opposite side of the fifth fuse and the 5-$2^{nd}$ heater.

For example, the sixth switching unit may include a sixth fuse having one side connected to one of the 5-$1^{st}$ heater and the 5-$2^{nd}$ heater and a sixth switch disposed between the opposite side of the sixth fuse and the remaining one of the 5-$1^{st}$ heater and the 5-$2^{nd}$ heater.

BRIEF DESCRIPTION OF THE DRAWINGS

Arrangements and embodiments may be described in detail with reference to the following drawings in which like reference numerals refer to like elements and wherein.

DETAILED DESCRIPTION OF ILLUSTRATIVE EMBODIMENTS

The present disclosure will now be described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, fuel cell vehicles 100A, 100B, 100C and 100D according to embodiments will be described using the Cartesian coordinate system. However, the embodiments are not limited thereto. In the Cartesian coordinate system, the x-axis, the y-axis, and the z-axis are perpendicular to each other, but the embodiments are not limited thereto. That is, the x-axis, the y-axis, and the z-axis may intersect each other obliquely, rather than being perpendicular to each other. Hereinafter, for convenience of description, the +x-axis or the −x-axis will be referred to as a "first direction", the +y-axis or the −y-axis will be referred to as a "second direction", and the +z-axis or the −z-axis will be referred to as a "third direction".

Hereinafter, the configurations of fuel cell vehicles 100A to 100D according to embodiments will be described with reference to the accompanying drawings.

Figure 1:
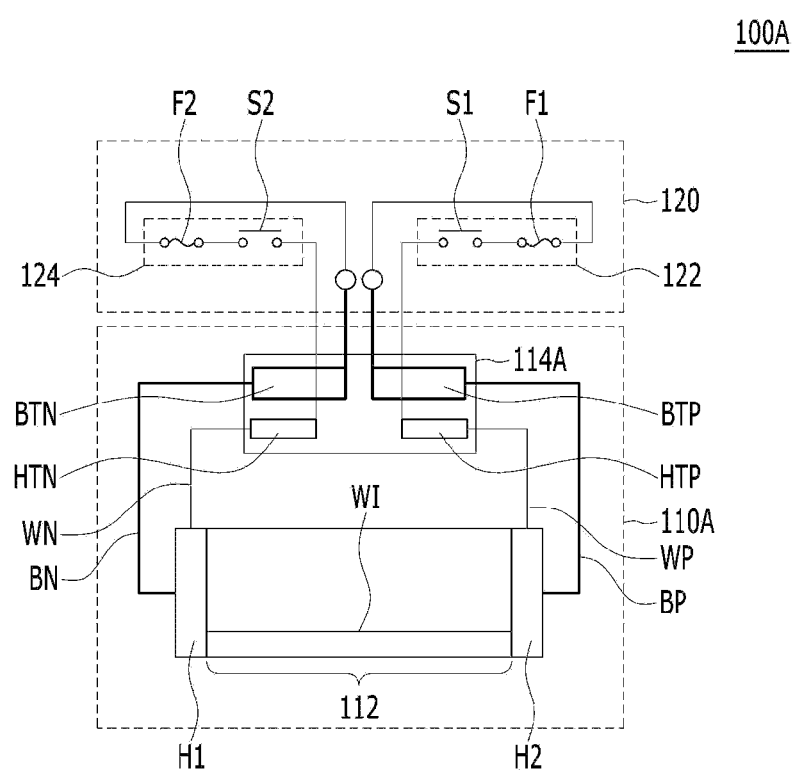
FIG. 1 is a block diagram of a fuel cell vehicle according to an embodiment.
Figure 2:
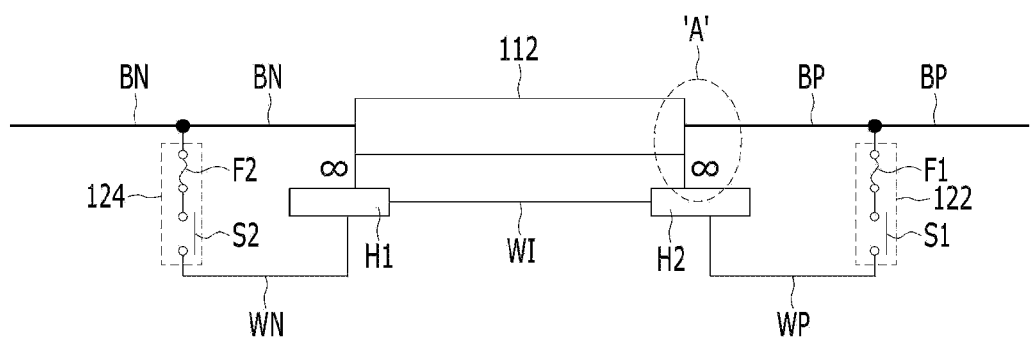
FIG. 2 is a circuit diagram of the fuel cell vehicle shown in FIG. 1.

FIG. 1 is a block diagram of a fuel cell vehicle 100A according to an embodiment, and FIG. 2 is a circuit diagram of the fuel cell vehicle 100A shown in FIG. 1.

The fuel cell vehicle 100A includes a fuel cell 110A and a junction box (or a high-voltage junction box) 120.

The fuel cell 110A may be, for example, a polymer electrolyte membrane fuel cell (or a proton exchange membrane fuel cell) (PEMFC), which has been studied most extensively as a power source for driving vehicles. However, the embodiment is not limited to any specific form of fuel cell.

The fuel cell 110A may include a cell stack 112, a terminal block 114, heaters H1 and H2, a positive bus bar BP, a negative bus bar BN, a positive wire WP, a negative wire WN, an intermediate wire WI, and a current collector (or a current-collecting terminal) (not shown).

For better understanding, in all block diagrams and circuit diagrams including FIGS. 1 and 2, the positive and negative bus bars BP and BN are denoted by thick solid lines, and the positive and negative wires WP and WN are denoted by thin solid lines.

Figure 3:
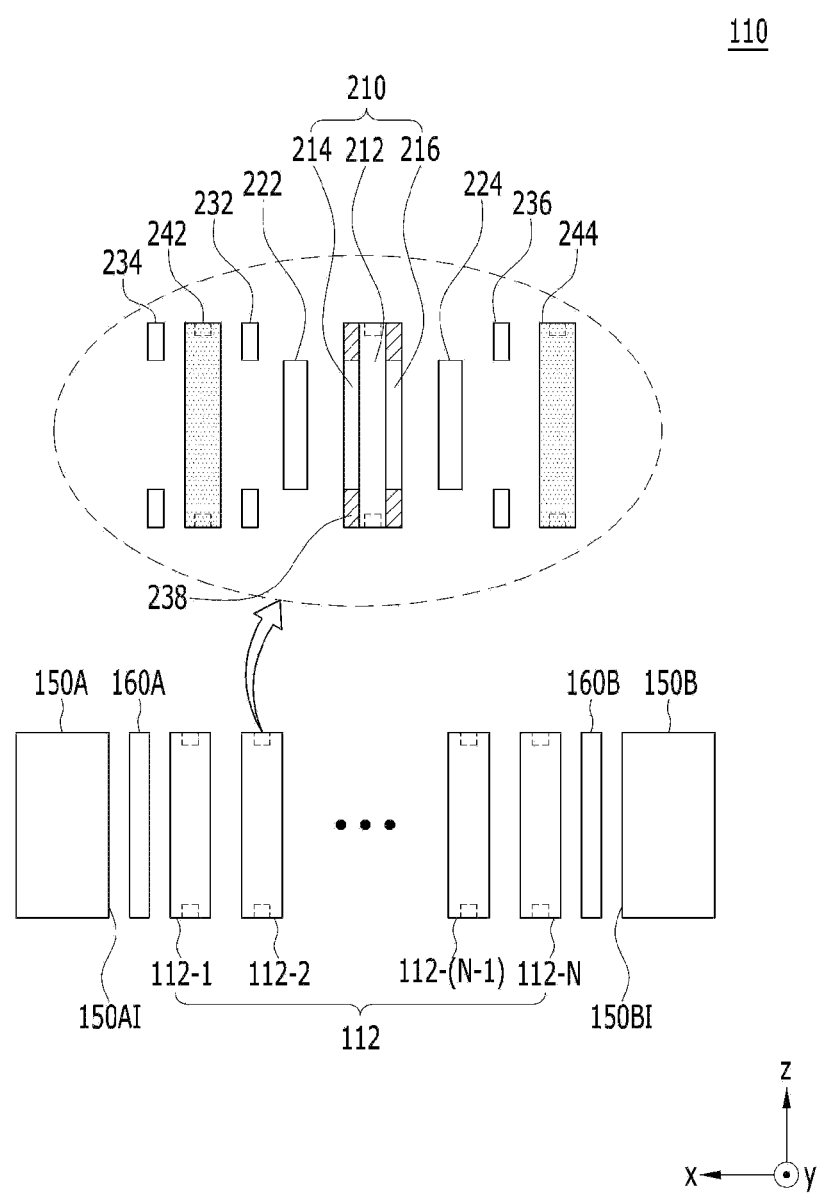
FIG. 3 is a cross-sectional view for explaining a heater, a current collector, and a cell stack of the fuel cell shown in FIG. 1.

FIG. 3 is a cross-sectional view for explaining the heaters H1 and H2, the current collector, and the cell stack 112 of the fuel cell 110A shown in FIG. 1.

The fuel cell 110 shown in FIG. 3 may include a cell stack 112, first and second end plates (or pressing plates or compression plates) 150A and 150B, and first and second end cell heater assemblies 160A and 160B.

For convenience of description, the first and second end plates 150A and 150B shown in FIG. 3 are not illustrated in FIGS. 1 and 2, and only the heaters H1 and H2, which are respectively included in the first and second end cell heater assemblies 160A and 160B, are illustrated in FIGS. 1 and 2. Further, for convenience of description, the terminal block 114, the positive bus bar BP, the negative bus bar BN, the positive wire WP, the negative wire WN, and the intermediate wire WI shown in FIG. 1 are not illustrated in FIG. 3.

The cell stack 112 may include a plurality of unit cells 112-1 to 112-N, which are stacked in the first direction. Here, "N" is a positive integer of 1 or greater, and may range from several tens to several hundreds. The embodiment is not limited to any specific value of "N". Each unit cell 122-$n$ may generate 0.6 volts to 1.0 volt of electricity. Here, $1 \leq n \leq N$. Thus, "N" may be determined in accordance with the intensity of the electric power to be supplied from the fuel cell 110A or 110 to a load (not shown) of the fuel cell vehicle 100A that requires electric power.

Each unit cell 112-$n$ may include a membrane electrode assembly (MEA) 210, gas diffusion layers (GDLs) 222 and 224, gaskets 232, 234 and 236, and separators (or bipolar plates) 242 and 244.

The membrane electrode assembly 210 has a structure in which catalyst electrode layers, in which an electrochemical reaction occurs, are attached to both sides of an electrolyte membrane through which hydrogen ions move. Specifically, the membrane electrode assembly 210 may include a polymer electrolyte membrane (or a proton exchange membrane) 212, a fuel electrode (or a hydrogen electrode or an anode) 214, and an air electrode (or an oxygen electrode or a cathode) 216. In addition, the membrane electrode assembly 210 may further include a sub-gasket 238.

The polymer electrolyte membrane 212 is disposed between the fuel electrode 214 and the air electrode 216.

Hydrogen, which is the fuel in the fuel cell 110 or 110A, may be supplied to the fuel electrode 214 through the first separator 242, and air containing oxygen as an oxidizer may be supplied to the air electrode 216 through the second separator 244.

The hydrogen supplied to the fuel electrode 214 is decomposed into hydrogen ions (protons) (H+) and electrons (e−) by the catalyst. The hydrogen ions alone may be selectively transferred to the air electrode 216 through the polymer electrolyte membrane 212, and at the same time, the electrons may be transferred to the air electrode 216 through the separators 242 and 244, which are conductors. In order to realize the above operation, a catalyst layer may be applied to each of the fuel electrode 214 and the air electrode 216. The movement of the electrons described above causes the electrons to flow through an external wire, thus generating current. That is, the fuel cell 110 or 110A may generate electric power due to the electrochemical reaction between hydrogen, which is the fuel, and oxygen contained in the air.

In the air electrode 216, the hydrogen ions supplied through the polymer electrolyte membrane 212 and the electrons transferred through the separators 242 and 244 meet the oxygen in the air supplied to the air electrode 216, thus causing a reaction that generates water (or "condensate water" or "product water").

In some cases, the fuel electrode 214 may be referred to as an anode, and the air electrode 216 may be referred to as a cathode. Alternatively, the fuel electrode 214 may be referred to as a cathode, and the air electrode 216 may be referred to as an anode.

The gas diffusion layers 222 and 224 serve to uniformly distribute hydrogen and oxygen, which are reactant gases, and to transfer the generated electrical energy. To this end, the gas diffusion layers 222 and 224 may be disposed on respective sides of the membrane electrode assembly 210. That is, the first gas diffusion layer 222 may be disposed on the left side of the fuel electrode 214, and the second gas diffusion layer 224 may be disposed on the right side of the air electrode 216.

The first gas diffusion layer 222 may serve to diffuse and uniformly distribute hydrogen supplied as a reactant gas through the first separator 242, and may be electrically conductive. The second gas diffusion layer 224 may serve to diffuse and uniformly distribute air supplied as a reactant gas through the second separator 244, and may be electrically conductive. Each of the first and second gas diffusion layers 222 and 224 may be a microporous layer in which fine carbon fibers are combined.

The gaskets 232, 234 and 236 may serve to maintain the airtightness and clamping pressure of the cell stack at an appropriate level with respect to the reactant gases and the coolant, to disperse the stress when the separators 242 and 244 are stacked, and to independently seal the flow paths. As such, since airtightness and watertightness are maintained by the gaskets 232, 234 and 236, the flatness of the surfaces that are adjacent to the cell stack 112, which generates electric power, may be secured, and thus surface pressure may be uniformly distributed over the reaction surfaces of the cell stack 112.

The first end cell heater assembly 160A may be disposed between an inner surface 150AI of the first end plate 150A, which faces the cell stack 112, and the first unit cell 112-1 of the cell stack 112. The second end cell heater assembly 160B may be disposed between the inner surface 150BI of the second end plate 150B, which faces the cell stack 112, and the $N^{th}$ unit cell 112-N of the cell stack 112.

Hereinafter, the first end cell heater assembly 160A will be described with reference to FIGS. 4A and 4B. Although not shown, the second end cell heater assembly 160B may have the same configuration as the first end cell heater assembly 160A shown in FIGS. 4A and 4B. For example, the second end cell heater assembly 160B may have planar and cross-sectional shapes symmetrical to those of the first end cell heater assembly 160A with respect to the center of the cell stack 112 in the first direction.

Figure 4A:
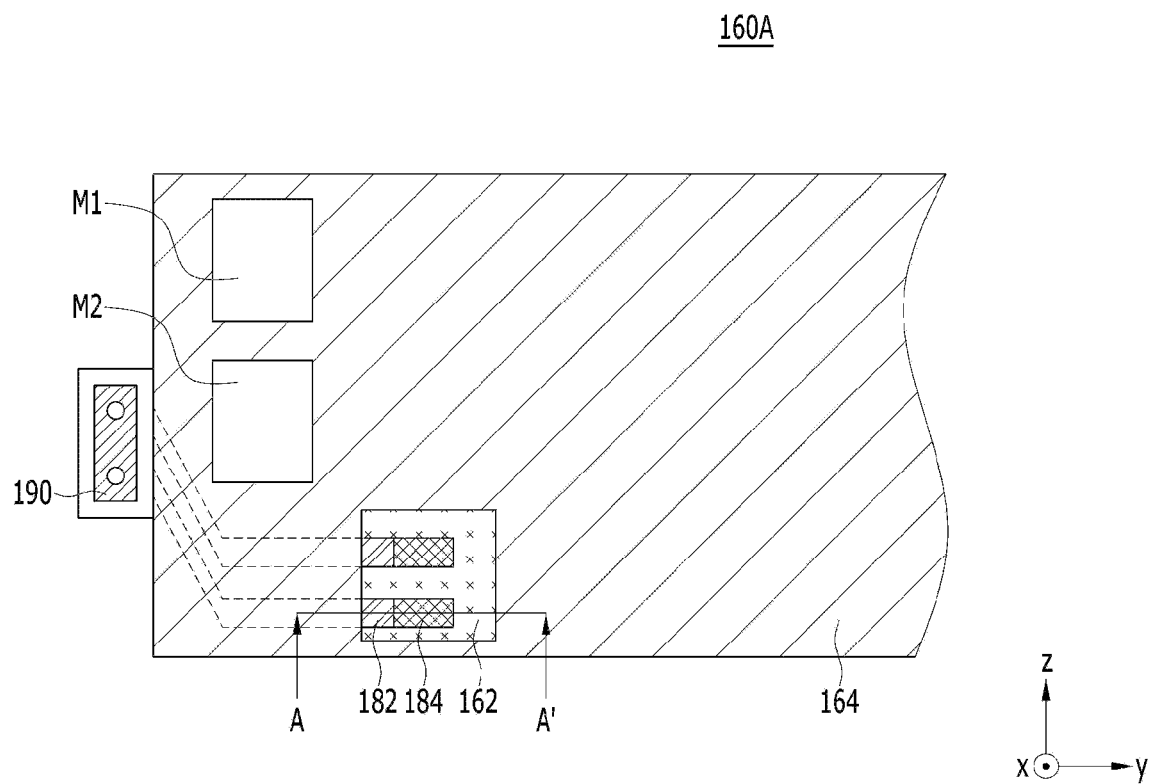
FIG. 4A is a plan view of an embodiment of the first end cell heater assembly shown in FIG. 3.
Figure 4B:
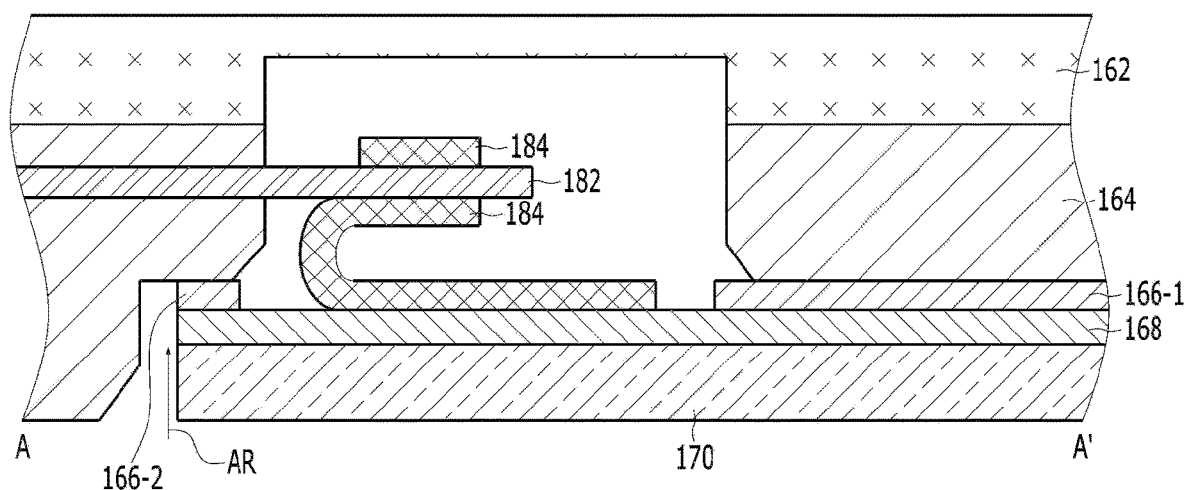
FIG. 4B is a cross-sectional view taken along line A-A' in the first end cell heater assembly shown in FIG. 4A.

FIG. 4A is a plan view of an embodiment of the first end cell heater assembly 160A shown in FIG. 3, and FIG. 4B is a cross-sectional view taken along line A-A' in the first end cell heater assembly 160A shown in FIG. 4A.

For convenience of description, an illustration of the current collector 170 shown in FIG. 4B is omitted from FIGS. 1 and 2.

The first end cell heater assembly 160A may include a lower plate 162, an upper plate 164, insulating pads 166-1 and 166-2, a heater (or a heat-generating unit) 168, a current collector 170, a pair of male heater connectors 182, and a pair of female heater connectors 184. In addition, the first end cell heater assembly 160A may further include a heater wiring connector 190. Here, the heater 168 may correspond to the first heater H1 shown in FIGS. 1 and 2. The second heater H2 shown in FIGS. 1 and 2 may be included in the second end cell heater assembly 160B, which has a shape symmetrical to that of the first end cell heater assembly 160A shown in FIGS. 4A and 4B.

The insulating pads 166-1 and 166-2 may be disposed between the upper plate 164 and the heater 168.

The heater 168 may be disposed at each of the two end portions of the cell stack 112 to heat the cell stack 112. Referring to FIG. 4B, the heater 168 may be disposed between the insulating pads 166-1 and 166-2 and the current collector 170. In order to secure insulation between the current collector 170 and the female heater connector 184, the heater 168 may be made of an insulating material.

When the pair of male heater connectors 182 is inserted into the pair of female heater connectors 184, the male heater connector 182 and the female heater connector 184 may be electrically connected to each other. In this case, the pair of male heater connectors 182 may be electrically connected to the heater wiring connector 190 shown in FIG. 4A. With this configuration, when current is supplied through the heater wiring connector 190, the heater 168 may generate heat.

The current collector 170 may be disposed under the heater 168. In this way, the current collector 170 is disposed at each of the two end portions of the cell stack 112 so as to be in contact with the heater 168, and collects the electrical energy generated by the flow of electrons through the cell stack 112 and transfers the electrical energy to the junction box 120. The electric power transferred to the junction box 120 is supplied to a load that uses the fuel cell 110 or 110A.

Referring again to FIG. 3, the separators 242 and 244 may serve to move the reactant gases and the cooling medium and to separate each of the unit cells from the other unit cells. In addition, the separators 242 and 244 may serve to structurally support the membrane electrode assembly 210 and the gas diffusion layers 222 and 224 and to collect the generated current and transfer the collected current to the current collector 170.

The separators 242 and 244 may be respectively disposed outside the gas diffusion layers 222 and 224. That is, the first separator 242 may be disposed on the left side of the first gas diffusion layer 222, and the second separator 244 may be disposed on the right side of the second gas diffusion layer 224.

The first separator 242 serves to supply hydrogen as a reactant gas to the fuel electrode 214 through the first gas diffusion layer 222. The second separator 244 serves to supply air as a reactant gas to the air electrode 216 through the second gas diffusion layer 224. In addition, each of the first and second separators 242 and 244 may form a channel through which the cooling medium (e.g. coolant) may flow. Further, the separators 242 and 244 may be formed of a graphite-based material, a composite graphite-based material, or a metal-based material.

The end plates 150A and 150B shown in FIG. 3 may be disposed at respective side ends of the cell stack 112, and may support and fix the cell stack 112, in which a plurality of unit cells is stacked. That is, the first end plate 150A may be disposed at one side end of the cell stack 112, and the second end plate 150B may be disposed at the opposite side end of the cell stack 112.

Each of the end plates 150A and 150B may be formed such that a metal insert is enveloped by a plastic injection-molded product. The metal insert of each of the end plates 150A and 150B may have high rigidity to withstand internal surface pressure, and may be implemented by machining a metal material. For example, each of the end plates 150A and 150B may be formed by combining a plurality of plates.

In addition, the first end plate 150A may include a plurality of manifolds (or communication portions). The manifolds may include an inlet manifold and an outlet manifold. Hydrogen and oxygen, which are reactant gases required for the membrane electrode assembly 210, may be introduced from the outside into the cell stack 112 through the inlet manifold (e.g. M1 shown in FIG. 4A). A gas or liquid, to which the reactant gas supplied after being humidified and the condensate water generated in the cell are added, may be discharged to the outside of the fuel cell 110 or 110A through the outlet manifold. In addition, the cooling medium may enter the cell stack 112 from the outside through the inlet manifold (e.g. M2 shown in FIG. 4A), and may be discharged to the outside through the outlet manifold. In this way, the plurality of manifolds allows fluid to flow into and out of the membrane electrode assembly 210.

Although not shown, the fuel cell 110 or 110A may further include an enclosure (not shown) disposed so as to envelop at least a portion of the cell stack 112 disposed between the end plates 150A and 150B. In addition, the enclosure may serve as a clamping member for clamping the plurality of unit cells together with the end plates 150A and 150B in the first direction. The pressure by which the cell stack 112 is clamped may be maintained by the enclosure and the end plates 150A and 150B, which have a rigid body structure. However, the embodiment is not limited to any specific form of clamping member.

Referring again to FIGS. 1 and 2, the terminal block 114A serves to electrically connect each of the current collector 170 and the heaters H1 and H2 to the junction box 120. For example, the terminal block 114A may protrude from the upper surface of the fuel cell 110A toward the junction box 120 so as to be electrically connected to the junction box 120.

Hereinafter, an embodiment of a terminal block will be described with reference to the accompanying drawings.

Figure 5A:
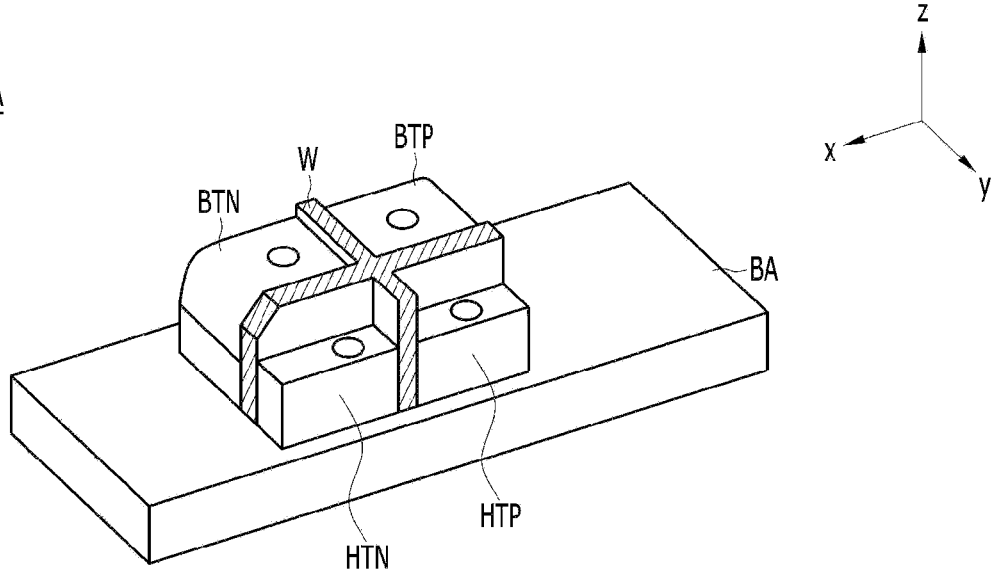
FIGS. 5A and 5B are respectively a perspective view and a plan view of a terminal block according to an embodiment.
Figure 5B:
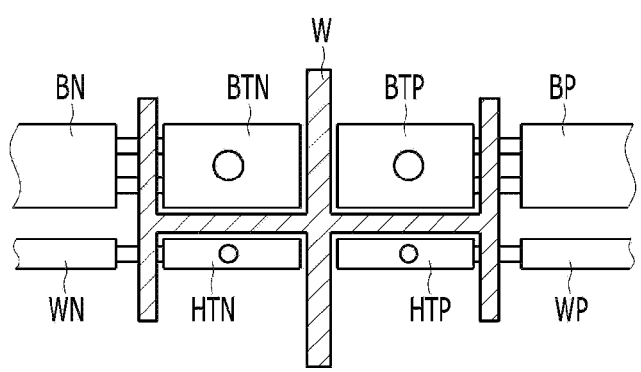
Figure 6A:
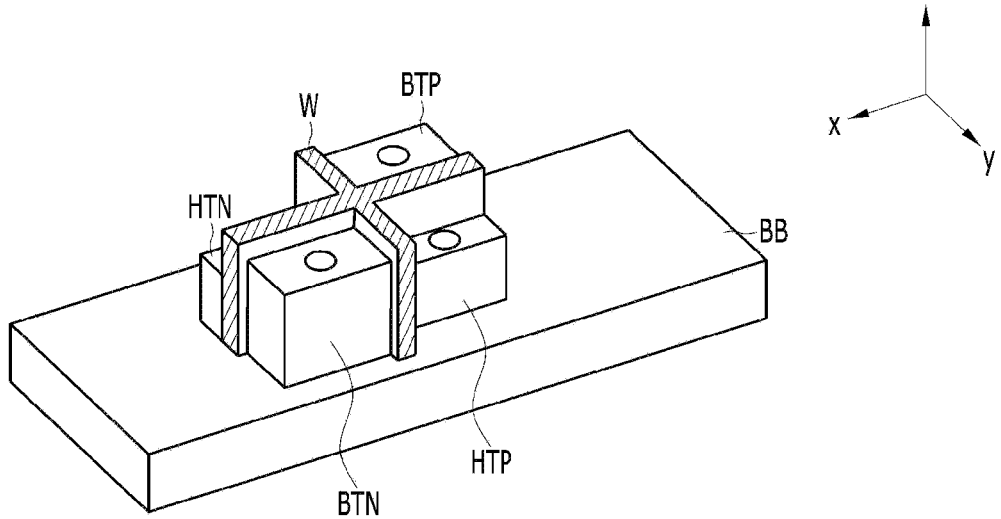
FIGS. 6A and 6B are respectively a perspective view and a plan view of a terminal block according to another embodiment.
Figure 6B:
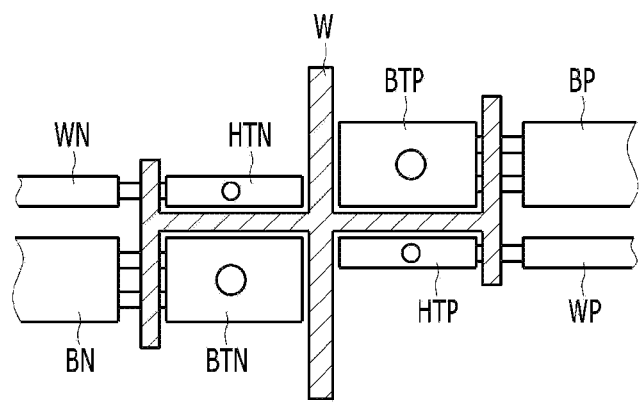
Figure 6B:
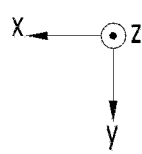

FIGS. 5A and 5B are respectively a perspective view and a plan view of a terminal block 114A according to an embodiment, and FIGS. 6A and 6B are respectively a perspective view and a plan view of a terminal block 114B according to another embodiment.

The fuel cell vehicle 100A shown in FIGS. 1 and 2 and each of the fuel cell vehicle 100B, 100C and 100D, which will be described later, will be described as including a terminal block 114A having the configuration shown in FIGS. 5A and 5B, but the embodiment is not limited thereto. According to another embodiment, the fuel cell vehicle 100A shown in FIGS. 1 and 2 and each of the fuel cell vehicle 100B, 100C and 100D, which will be described later, may include a terminal block 114B having the configuration shown in FIGS. 6A and 6B.

Referring to FIGS. 5A to 6B, the terminal block 114A or 114B may include a body BA or BB, a partition wall W, a positive bus terminal BTP, a negative bus terminal BTN, a positive heater terminal HTP, and a negative heater terminal HTN.

Each of the body BA or BB and the partition wall W may be made of an insulating material. At least a portion of each of the positive bus terminal BTP, the negative bus terminal BTN, the positive heater terminal HTP, and the negative heater terminal HTN may be embedded in the body BA or BB, or may be disposed on the body BA or BB.

The partition wall W is disposed on the body BA or BB to electrically isolate the positive bus terminal BTP, the negative bus terminal BTN, the positive heater terminal HTP, and the negative heater terminal HTN from each other.

The positive bus terminal BTP may be connected to the positive bus bar BP, the negative bus terminal BTN may be connected to the negative bus bar BN, the positive heater terminal HTP may be connected to the positive wire WP, and the negative heater terminal HTN may be connected to the negative wire WN. To this end, conducting wires may be disposed in the terminal block 114A or 114B.

Although not shown, the connection between BTP and BP, between BTN and BN, between HTP and WP, and between HTN and WN may be realized using, for example, electrically conductive bolts. However, the embodiment is not limited to any specific form of connection between BTP and BP, between BTN and BN, between HTP and WP, or between HTN and WN.

As will be described later, the terminals BTP, BTN, HTP and HTN of the terminal block 114A or 114B serve to connect the bus bars BP and BN and the wires WP and WN included in the fuel cell 110A to the junction box 120.

According to an embodiment, as shown in FIGS. 5A and 5B, the positive bus terminal BTP and the negative bus terminal BTN may be aligned in the first direction, and the positive heater terminal HTP and the negative heater terminal HTN may be aligned in a direction parallel to the first direction.

According to another embodiment, one of the positive bus terminal BTP and the negative bus terminal BTN and one of the positive heater terminal HTP and the negative heater terminal HTN may be aligned in the first direction, and the other one of the positive bus terminal BTP and the negative bus terminal BTN and the other one of the positive heater terminal HTP and the negative heater terminal HTN may be aligned in a direction parallel to the first direction. In one example, as shown in FIGS. 6A and 6B, the positive bus terminal BTP and the negative heater terminal HTN may be aligned in the first direction, and the negative bus terminal BTN and the positive heater terminal HTP may be aligned in a direction parallel to the first direction.

As shown in FIGS. 1 and 2, the fuel cell 110A including one cell stack 112 may include first and second heaters H1 and H2.

The first heater H1 may be disposed at one end portion of the cell stack 112, and may be connected to one of the positive wire WP and the negative wire WN. The second heater H2 may be disposed at the opposite end portion of the cell stack 112, and may be connected to the other one of the positive wire WP and the negative wire WN. In one example, as illustrated in FIGS. 1 and 2, the first heater H1 may be disposed at one end portion of the cell stack 112, and may be connected to the negative wire WN. The second heater H2 may be disposed at the opposite end portion of the cell stack 112, and may be connected to the positive wire WP.

Inside the fuel cell 110A, the heaters and the current collectors may be connected to the junction box 120 via the terminal block 114A or 114B. To this end, the positive bus bar BP and the negative bus bar BN may electrically connect the current collectors and the terminal block 114A or 114B, and the positive wire WP and the negative wire WN may electrically connect the heaters H1 and H2 and the terminal block 114A or 114B. In this case, the current collector that is in contact with the first heater H1 is referred to as a "first current collector", and the current collector that is in contact with the second heater H2 is referred to as a "second current collector". The heaters H1 and H2 and the current collectors may be in contact with each other, as illustrated in FIG. 4B.

In one example, the negative bus bar BN may electrically connect the first current collector to the negative bus terminal BTN of the terminal block 114A or 114B, and the positive bus bar BP may electrically connect the second current collector to the positive bus terminal BTP of the terminal block 114A or 114B. In this way, the negative bus bar BN and the positive bus bar BP may connect the first and second current collectors and the terminal block 114A or 114B, thereby allowing the electricity generated in the cell stack 112 to be transferred to the junction box 120 through the terminal block 114A or 114B. To this end, each of the negative bus bar BN and the positive bus bar BP may be implemented as a conductor.

In addition, the negative wire WN may electrically connect the first heater H1 to the negative heater terminal HTN of the terminal block 114A or 114B, and the positive wire WP may electrically connect the second heater H2 to the positive heater terminal HTP of the terminal block 114A or 114B.

In this case, the intermediate wire WI may be disposed between the first heater H1 and the second heater H2, and may electrically connect the first heater H1 and the second heater H2.

The junction box 120 may serve to receive the electric power generated in the fuel cell 110A and to distribute the same. To this end, the junction box 120 may be electrically connected to the fuel cell 110 or 110A via the terminal block 114A or 114B.

According to an embodiment, the junction box 120 may include first and second switching units 122 and 124.

The first switching unit 122 may be disposed between the positive wire WP and the positive bus bar BP, and the second switching unit 124 may be disposed between the negative wire WN and the negative bus bar BN.

Referring to FIG. 1, the positive bus terminal BTP of the terminal block 114A connects the positive bus bar BP to a first end portion of the first switching unit 122. The positive heater terminal HTP connects the positive wire WP to a second end portion of the first switching unit 122, which is opposite the first end portion of the first switching unit 122. The negative bus terminal BTN connects the negative bus bar BN to a third end portion of the second switching unit 124. The negative heater terminal HTN connects the negative wire WN to a fourth end portion of the second switching unit 124, which is opposite the third end portion of the second switching unit 124.

The first switching unit 122 may include a first fuse F1 and a first switch S1. The first fuse F1 may have one side connected to the first end portion of the first switching unit 122, and the first switch S1 may be disposed between the opposite side of the first fuse F1 and the second end portion of the first switching unit 122.

The second switching unit 124 may include a second fuse F2 and a second switch S2. The second fuse F2 may have one side connected to the third end portion of the second switching unit 124, and the second switch S2 may be disposed between the opposite side of the second fuse F2 and the fourth end portion of the second switching unit 124.

Referring to FIG. 2, when the first switching unit 122 and the second switching unit 124 are switched on, a closed loop may be formed such that current is supplied to the first and second heaters H1 and H2, whereby the first and second heaters H1 and H2 may generate heat. This operation will be described in detail later.

Figure 7:
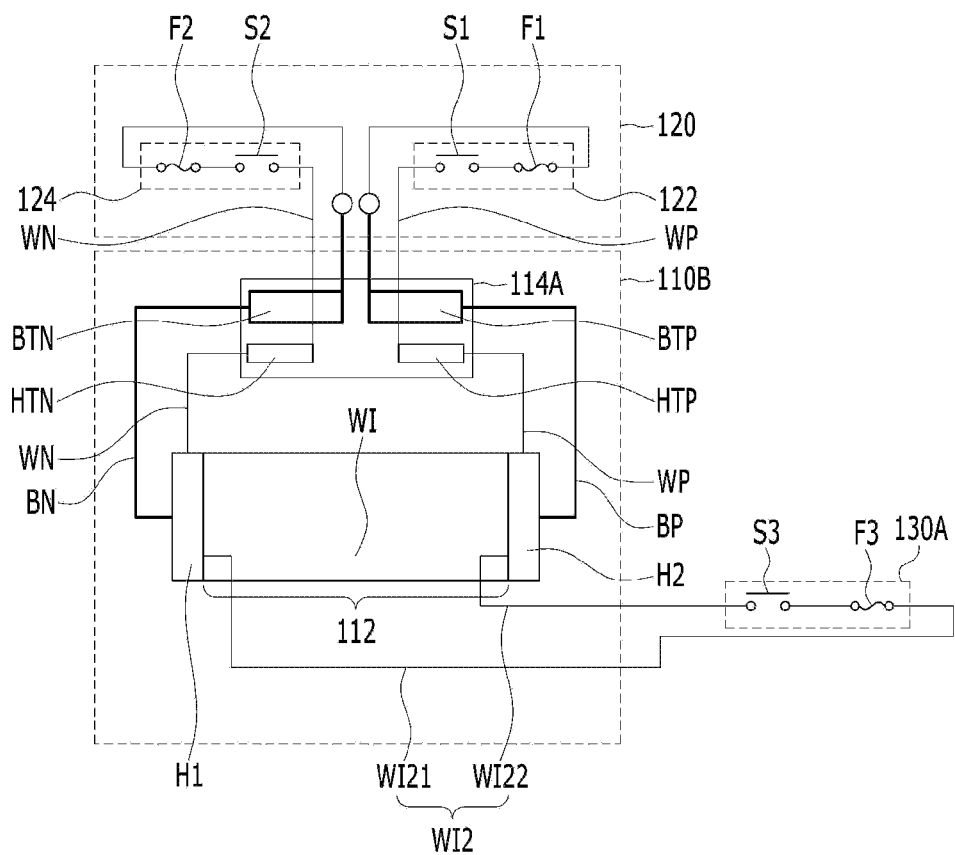
FIG. 7 is a block diagram of a fuel cell vehicle according to another embodiment.
Figure 8:
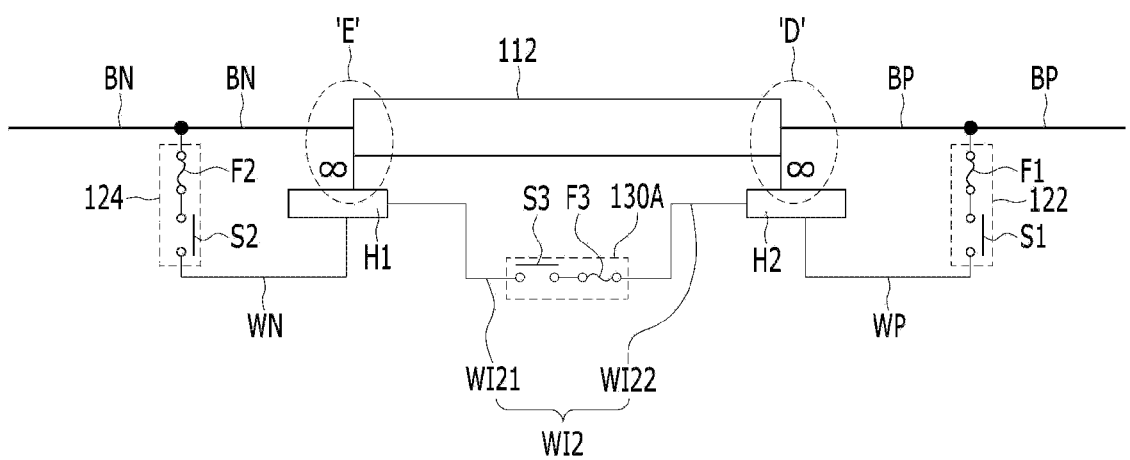
FIG. 8 is a circuit diagram of the fuel cell vehicle shown in FIG. 7.

FIG. 7 is a block diagram of a fuel cell vehicle 100B according to another embodiment, and FIG. 8 is a circuit diagram of the fuel cell vehicle 100B shown in FIG. 7.

Unlike the fuel cell vehicle 100A shown in FIGS. 1 and 2, the fuel cell vehicle 100B shown in FIGS. 7 and 8 may further include a third switching unit 130A, and an intermediate wire WI2 may electrically connect the first heater H1 and the second heater H2 only when the third switching unit 130A is switched on, rather than directly connecting the first heater H1 and the second heater H2. Except for this difference, the fuel cell vehicle 100B shown in FIGS. 7 and 8 is the same as the fuel cell vehicle 100A shown in FIGS. 1 and 2, and thus a duplicate description of identical parts will be omitted.

The third switching unit 130A may be disposed in the path of the intermediate wire WI2 between the first heater H1 and the second heater H2. The intermediate wire WI2 may include an intermediate wire WI21, which connects the first heater H1 to one end of the third switching unit 130A, and another intermediate wire WI22, which connects the opposite end of the third switching unit 130A to the second heater H2.

The third switching unit 130A may include a third fuse F3 and a third switch S3. The third fuse F3 may have one side connected to one (e.g. H1) of the first and second heaters H1 and H2, and the third switch S3 may be disposed between the opposite side of the third fuse F3 and the other one (e.g. H2) of the first and second heaters H1 and H2.

Each of the above-described fuel cells 110A and 110B shown in FIGS. 1, 2, 7 and 8 includes only one cell stack 112. However, the fuel cell according to the embodiment may include a plurality of cell stacks.

Hereinafter, a fuel cell including two cell stacks will be described. However, the following description may also apply to a fuel cell including three or more cell stacks.

Figure 9:
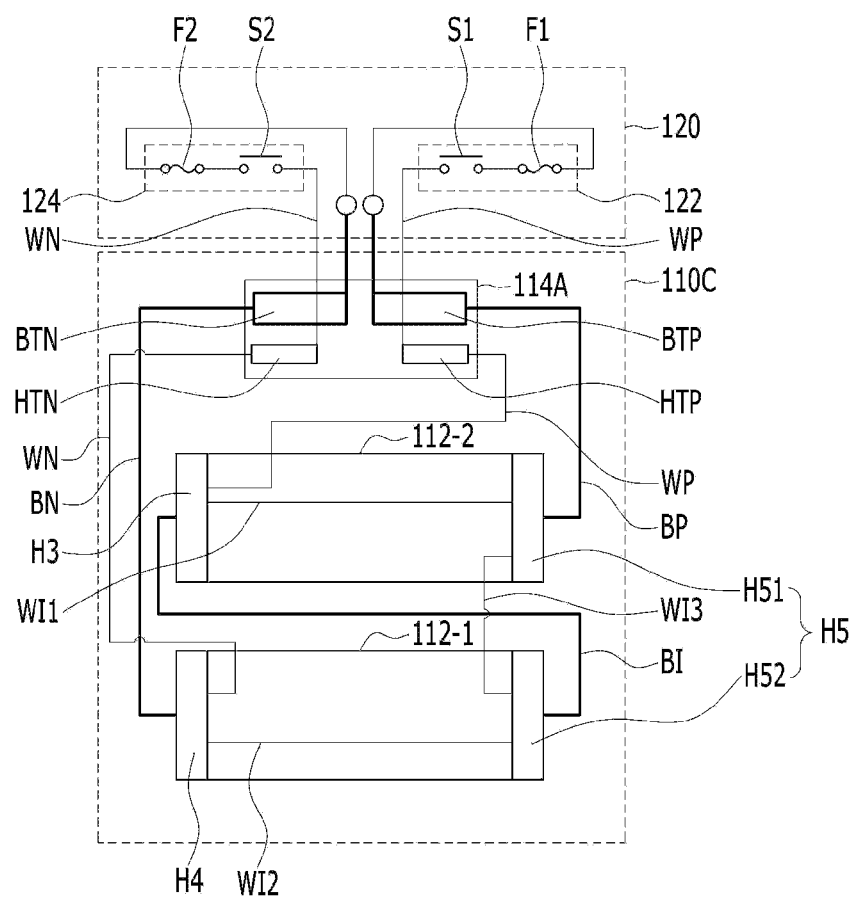
FIG. 9 is a block diagram of a fuel cell vehicle according to still another embodiment.
Figure 10:
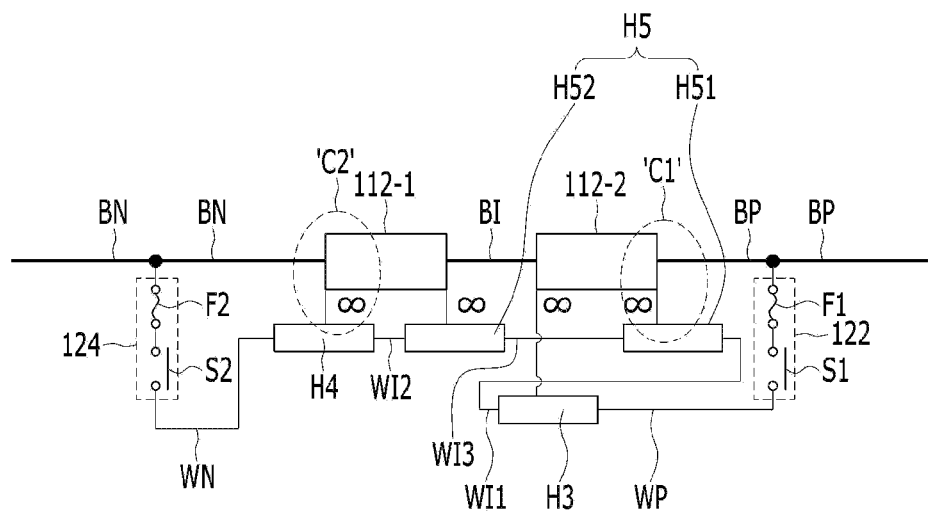
FIG. 10 is a circuit diagram of the fuel cell vehicle shown in FIG. 9.

FIG. 9 is a block diagram of a fuel cell vehicle 100C according to still another embodiment, and FIG. 10 is a circuit diagram of the fuel cell vehicle 100C shown in FIG. 9.

Unlike the fuel cell 110A shown in FIGS. 1 and 2, the fuel cell 110C shown in FIGS. 9 and 10 may include two cell stacks 112-1 and 112-2 and three intermediate wires WI1, WI2 and WI3, and may further include an intermediate bus bar BI. Except for this difference, the fuel cell vehicle 100C shown in FIGS. 9 and 10 is the same as the fuel cell vehicle 100A shown in FIGS. 1 and 2, and thus a duplicate description of identical parts will be omitted.

The first and second cell stacks 112-1 and 112-2 may be electrically connected to each other. For example, the intermediate bus bar BI may be disposed between the first and second cell stacks 112-1 and 112-2, and may electrically connect the first and second cell stacks 112-1 and 112-2. Each of the first and second cell stacks 112-1 and 112-2 may have the same configuration as the cell stack 112 shown in FIG. 2.

A fourth heater H4 and one (e.g. a 5-$2^{nd}$ heater H52) of fifth heaters H5 may be disposed at respective end portions of the first cell stack 112-1, and a third heater H3 and the other one (e.g. a 5-$1^{st}$ heater H51) of the fifth heaters H5 may be disposed at respective end portions of the second cell stack 112-2.

In the case in which the fuel cell 110C includes a plurality of cell stacks, a plurality of fifth heaters H5 may be disposed between the third and fourth heaters H3 and H4. For example, in the case in which the fuel cell 110C includes two cell stacks 112-1 and 112-2, two fifth heaters H5, namely a 5-$1^{st}$ heater H51 and a 5-$2^{nd}$ heater H52, may be disposed between the third and fourth heaters H3 and H4.

In this case, for convenience of description, the current collector that is in contact with the third heater H3 is referred to as a "third current collector", the current collector that is in contact with the fourth heater H4 is referred to as a "fourth current collector", the current collector that is in contact with one H51 of the fifth heaters H5 is referred to as a "5-$1^{st}$ current collector", and the current collector that is in contact with the other one H52 of the fifth heaters H5 is referred to as a "5-$2^{nd}$ current collector". The form in which these components are in contact with each other is the same as that illustrated in FIG. 4B.

In this case, the negative bus bar BN may electrically connect the fourth current collector to the negative bus terminal BTN of the terminal block 114A, and the positive bus bar BP may electrically connect the 5-$1^{st}$ current collector to the positive bus terminal BTP of the terminal block 114A.

In addition, the positive wire WP may electrically connect the third heater H3 to the positive heater terminal HTP of the terminal block 114A, and the negative wire WN may electrically connect the fourth heater H4 to the negative heater terminal HTN of the terminal block 114A.

The three intermediate wires WI1, WI2 and WI3 may electrically connect the heaters of the two cell stacks 112-1 and 112-2 to each other. Specifically, the first intermediate wire WI1 may connect the third heater H3 and the 5-$1^{st}$ heater H51, which is one of the plurality of fifth heaters H5. The second intermediate wire WI2 may connect the fourth heater H4 and the 5-$2^{nd}$ heater H52, which is the other one of the plurality of fifth heaters H5. The third intermediate wire WI3 may connect the plurality of fifth heaters H5 (H51 and H52) to each other.

Figure 11:
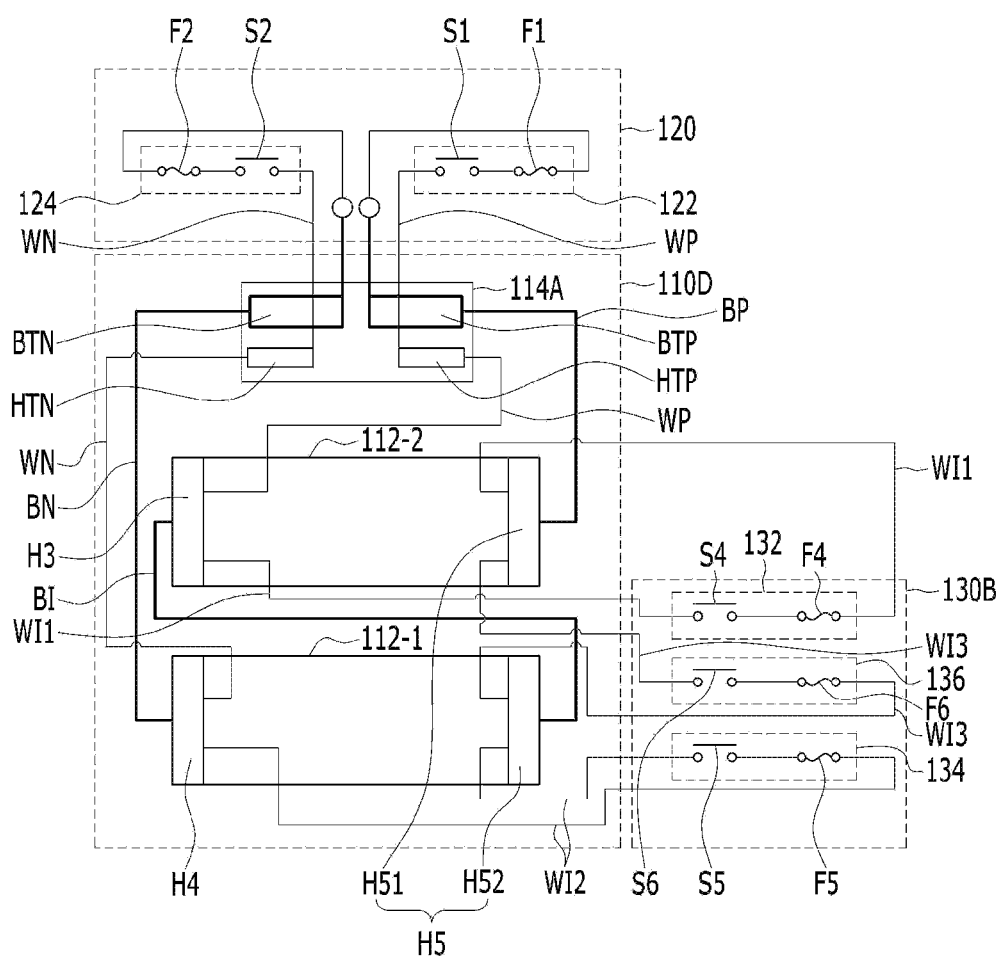
FIG. 11 is a block diagram of a fuel cell vehicle according to still another embodiment.
Figure 12:
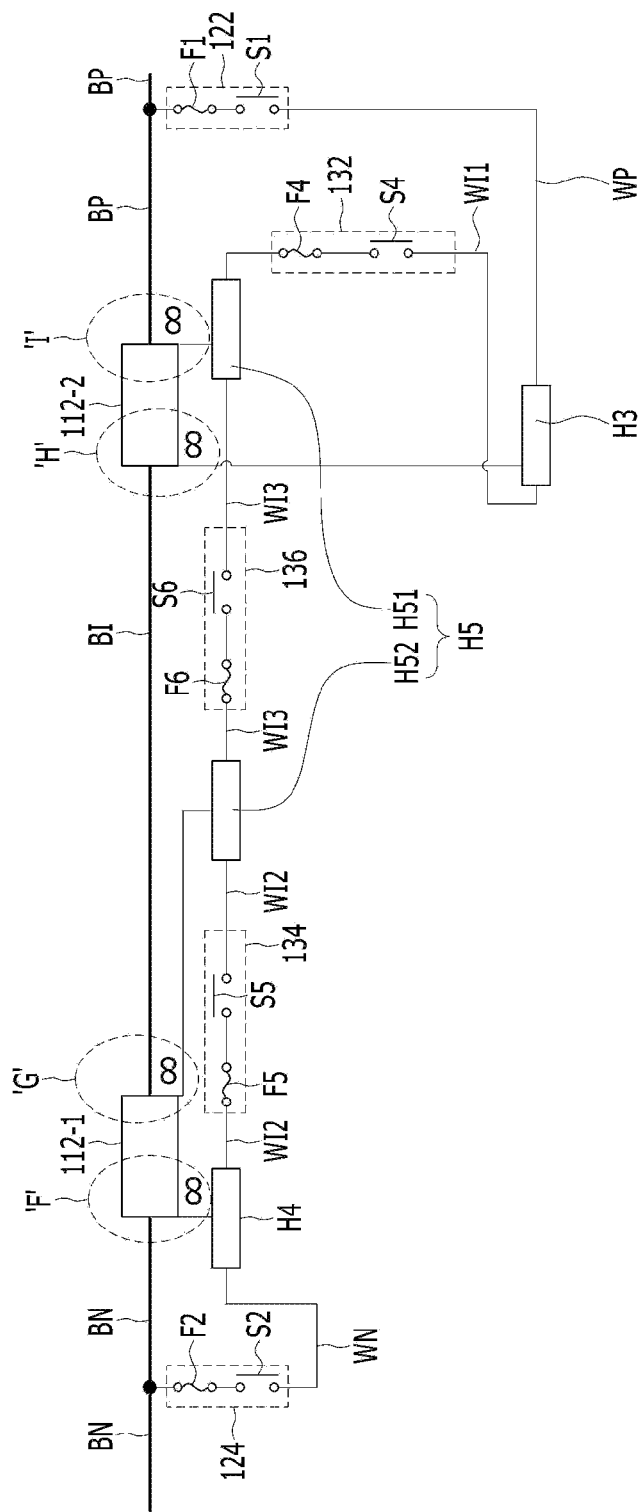
FIG. 12 is a circuit diagram of the fuel cell vehicle shown in FIG. 11.

FIG. 11 is a block diagram of a fuel cell vehicle 100D according to still another embodiment, and FIG. 12 is a circuit diagram of the fuel cell vehicle 100D shown in FIG. 11.

Unlike the fuel cell vehicle 100C shown in FIGS. 9 and 10, the fuel cell vehicle 100D shown in FIGS. 11 and 12 may further include a switching terminal 130B, and first to fourth heaters H1, H2, H3 and H4 may be electrically connected to each other via the first, second and third intermediate wires WI1, WI2 and WI3 only when corresponding ones of switching units 132, 134 and 136 included in the switching terminal 130B are switched on, rather than being directly connected to each other via the first, second and third intermediate wires WI1, WI2 and WI3. Except for this difference, the fuel cell vehicle 100D shown in FIGS. 11 and 12 is the same as the fuel cell vehicle 100C shown in FIGS. 9 and 10, and thus a duplicate description of identical parts will be omitted.

The switching terminal 130B may include fourth, fifth and sixth switching units 132, 134 and 136.

The fourth switching unit 132 may be disposed in the path of the first intermediate wire WI1 between the third heater H3 and the 5-$1^{st}$ heater H51. The fourth switching unit 132 may include a fourth fuse F4 and a fourth switch S4. The fourth fuse F4 may have one side connected to the 5-$1^{st}$ heater H51, and the fourth switch S4 may be disposed between the opposite side of the fourth fuse F4 and the third heater H3. Alternatively, unlike the illustrated configuration, the fourth fuse F4 may have one side connected to the third heater H3, and the fourth switch S4 may be disposed between the opposite side of the fourth fuse F4 and the 5-$1^{st}$ heater H51.

The fifth switching unit 134 may be disposed in the path of the second intermediate wire WI2 between the fourth heater H4 and the 5-$2^{nd}$ heater H52. The fifth switching unit 134 may include a fifth fuse F5 and a fifth switch S5. The fifth fuse F5 may have one side connected to the fourth heater H4, and the fifth switch S5 may be disposed between the opposite side of the fifth fuse F5 and the 5-$2^{nd}$ heater H52. Alternatively, unlike the illustrated configuration, the fifth fuse F5 may have one side connected to the 5-$2^{nd}$ heater H52, and the fifth switch S5 may be disposed between the opposite side of the fifth fuse F5 and the fourth heater H4.

The sixth switching unit 136 may be disposed in the path of the third intermediate wire WI3 between the 5-$1^{st}$ heater H51 and the 5-$2^{nd}$ heater H52. The sixth switching unit 136 may include a sixth fuse F6 and a sixth switch S6. The sixth fuse F6 may have one side connected to one (e.g. H52) of the 5-$1^{st}$ heater H51 and the 5-$2^{nd}$ heater H52, and the sixth switch S6 may be disposed between the opposite side of the sixth fuse F6 and the other one (e.g. H51) of the 5-$1^{st}$ heater H51 and the 5-$2^{nd}$ heater H52.

The above-described first to sixth fuses F1 to F6 may be omitted, and each of the first to sixth switches S1 to S6 may be implemented as, for example, a relay element, a bipolar transistor, or a field effect transistor.

Hereinafter, the operation of the fuel cell vehicles 100A, 100B, 100C and 100D according to the embodiments having the above-described configurations will be described with reference to the accompanying drawings.

The fuel cell vehicle 100A, 100B, 100C or 100D according to the embodiment may include first and second circuits.

The first circuit may form a path along which the current generated in the cell stack 112, 112-1 or 112-2 is collected in the current collector and is transferred to the junction box 120. The first circuit may be formed by the negative bus bar BN, the cell stack 112, and the positive bus bar BP, as shown in FIGS. 2 and 8, or may be formed by the negative bus bar BN, the first and second cell stacks 112-1 and 112-2, and the positive bus bar BP, as shown in FIGS. 10 and 12.

The second circuit may form a path along which the current supplied through the heater wiring connector 190 shown in FIG. 4 is transferred to the heaters through the male and female heater connectors 182 and 184 and a path that connects the plurality of heaters. The current path of the second circuit may be formed in order to heat the cell stack 112, 112-1 or 112-2 when cold-starting the fuel cell vehicle 100A, 100B, 100C or 100D. In the second circuit, when the second switching unit 124 is switched on, the negative wire WN may be connected to the negative bus bar BN inside the junction box 120, and when the first switching unit 122 is switched on, the positive wire WP may be connected to the positive bus bar BP inside the junction box 120.

As such, the first circuit and the second circuit are wholly different circuits, which are independent of each other, and need to be electrically isolated from each other. The confiiguration shown in FIGS. 4A and 4B is just an example for helping understanding of the situation in which the first circuit and the second circuit are short-circuited. Therefore, the configuration of each of the first and second end cell heater assemblies 160A and 160B according to the embodiment is not limited to the configuration shown in FIGS. 4A and 4B, so long as the first circuit and the second circuit are capable of being short-circuited.

When the first circuit and the second circuit are electrically isolated from each other, the male and female heater connectors 182 and 184 shown in FIG. 4B, which are connected to the first heater H1 shown in FIG. 2, may be opened rather than being short-circuited with the first current collector 170. The male and female heater connectors 182 and 184 shown in FIG. 4B, which are connected to the second heater H2 shown in FIG. 2, may be opened rather than being short-circuited with the second current collector 170. Here, the open state is indicated by infinite ($\infty$) resistance in FIG. 2. That is, the infinite ($\infty$) resistance refers to a state in which the current collectors and the male and female heater connectors 182 and 184 are completely electrically isolated from each other. Referring to FIG. 2, in the second circuit, in the state in which each of the first switching unit 122 and the second switching unit 124 is switched on, a closed loop may be formed by the negative bus bar BN, the second switching unit 124, the negative wire WN, the first heater H1, the intermediate wire WI, the second heater H2, the positive wire WP, the first switching unit 122, and the positive bus bar BP, with the result that the first and second heaters H1 and H2 may generate heat.

In addition, when the first circuit and the second circuit are electrically isolated from each other, the male and female heater connectors 182 and 184, which are connected to the first heater H1 and the second heater H2 shown in FIG. 8, may be opened rather than being respectively short-circuited with the first and second current collectors. Here, the open state is indicated by infinite ($\infty$) resistance in FIG. 8. That is, referring to FIG. 8, in the second circuit, in the state in which each of the first switching unit 122, the second switching unit 124 and the third switching unit 130A is switched on, a closed loop may be formed by the negative bus bar BN, the second switching unit 124, the negative wire WN, the first heater H1, one WI21 of the second intermediate wires WI2, the third switching unit 130A, the other one WI22 of the second intermediate wires WI2, the second heater H2, the positive wire WP, the first switching unit 122, and the positive bus bar BP, with the result that the first and second heaters H1 and H2 may generate heat.

In addition, when the first circuit and the second circuit are electrically isolated from each other, the male and female heater connectors 182 and 184, which are connected to the third, fourth, $5\text{-}1^{st}$ and $5\text{-}2^{nd}$ heaters H3, H4, H51 and H52 shown in FIG. 10, may be opened rather than being respectively short-circuited with the third, fourth, $5\text{-}1^{st}$ and $5\text{-}2^{nd}$ current collectors. Here, the open state is indicated by infinite ($\infty$) resistance in FIG. 10. That is, in the second circuit, in the state in which each of the first switching unit 122 and the second switching unit 124 is switched on, a closed loop may be formed by the negative bus bar BN, the second switching unit 124, the negative wire WN, the fourth heater H4, the second intermediate wire WI2, the $5\text{-}2^{nd}$ heater H52, the third intermediate wire WI3, the $5\text{-}1^{st}$ heater H1, the first intermediate wire WI1, the third heater H3, the positive wire WP, the first switching unit 122, and the positive bus bar BP, with the result that the fourth, $5\text{-}2^{nd}$, $5\text{-}1^{st}$ and third heaters H4, H52, H51 and H3 may generate heat.

In addition, when the first circuit and the second circuit are electrically isolated from each other, the male and female heater connectors 182 and 184, which are connected to the third, fourth, $5\text{-}1^{st}$ and $5\text{-}2^{nd}$ heaters H3, H4, H51 and H52 shown in FIG. 12, may be opened rather than being respectively short-circuited with the third, fourth, $5\text{-}1^{st}$ and $5\text{-}2^{nd}$ current collectors. Here, the open state is indicated by infinite ($\infty$) resistance in FIG. 12. That is, in the second circuit, in the state in which each of the first switching unit 122, the second switching unit 124, the fourth switching unit 132, the fifth switching unit 134, and the sixth switching unit 136 is switched on, a closed loop may be formed by the negative bus bar BN, the second switching unit 124, the negative wire WN, the fourth heater H4, the second intermediate wire WI2, the fifth switching unit 134, the second intermediate wire WI2, the $5\text{-}2^{nd}$ heater H52, the third intermediate wire WI3, the sixth switching unit 136, the third intermediate wire WI3, the $5\text{-}1^{st}$ heater H51, the first intermediate wire WI1, the fourth switching unit 132, the first intermediate wire WI1, the third heater H3, the positive wire WP, the first switching unit 122, and the positive bus bar BP, with the result that the fourth, $5\text{-}2^{nd}$, $5\text{-}1^{st}$ and third heaters H4, H52, H51 and H3 may generate heat.

Hereinafter, the configurations of the fuel cell vehicles 100A, 100B, 100C and 100D according to the above-described embodiments and the configuration of a fuel cell vehicle 10 according to a comparative example will be compared with reference to the accompanying drawings.

Figure 13:
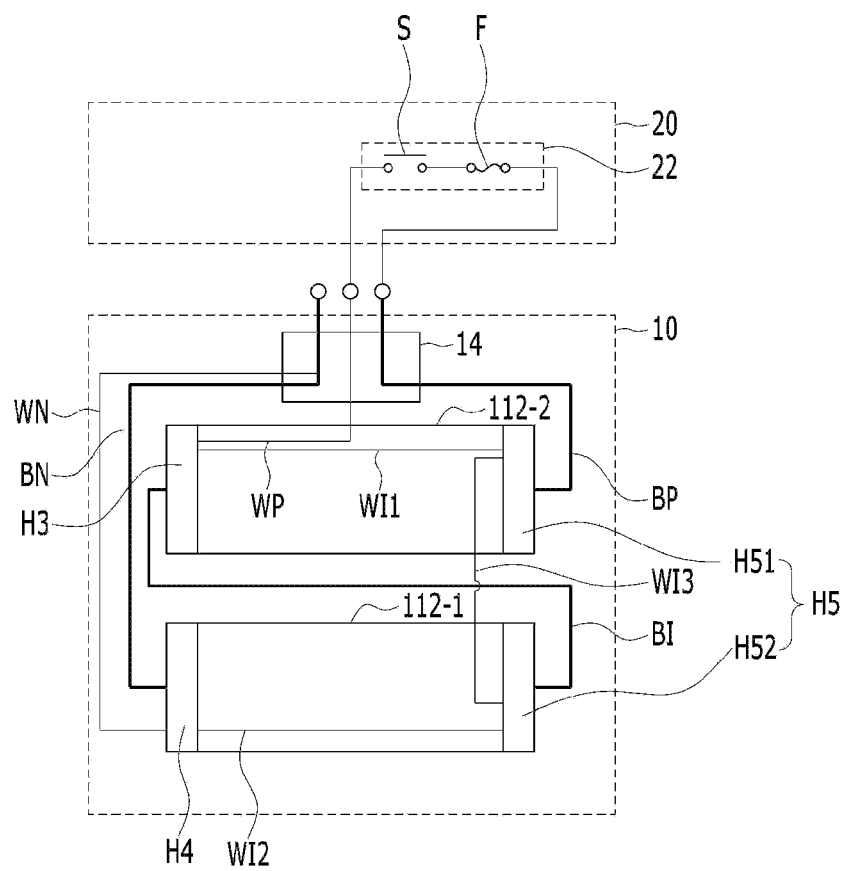
FIG. 13 is a block diagram of a fuel cell vehicle according to a comparative example.
Figure 14:
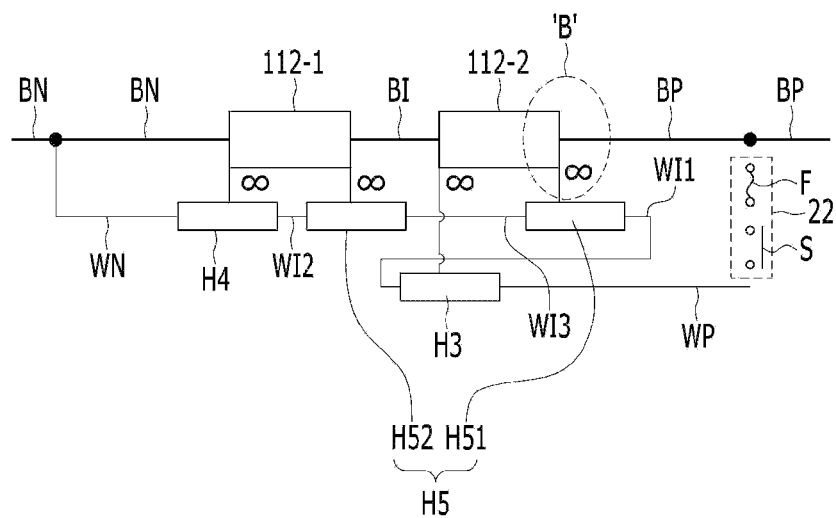
FIG. 14 is a circuit diagram of the fuel cell vehicle shown in FIG. 13.

FIG. 13 is a block diagram of a fuel cell vehicle 10 according to a comparative example, and FIG. 14 is a circuit diagram of the fuel cell vehicle 10 shown in FIG. 13.

The fuel cell vehicle 10 according to the comparative example includes a fuel cell 10 and a junction box 20. The fuel cell 10 and the junction box 20 perform the same functions as the fuel cells 110A, 110B, 110C and 110D and the junction box 120 according to the above-described embodiments, respectively, and thus a duplicate description thereof will be omitted.

The fuel cell 10 includes two cell stacks 112-1 and 112-2, third, fourth, $5\text{-}1^{st}$ and $5\text{-}2^{nd}$ heaters H3, H4, H51 and H52, a terminal block 14, a positive bus bar BP, a negative bus bar BN, a positive wire WP, a negative wire WN, an intermediate bus bar BI, and intermediate wires WI1 and WI2. Here, the two cell stacks 112-1 and 112-2, the third, fourth, 5-$1^{st}$ and 5-$2^{nd}$ heaters H3, H4, H51 and H52, the terminal block 14, the positive bus bar BP, the negative bus bar BN, the positive wire WP, the negative wire WN, the intermediate bus bar BI, and the intermediate wires WI1 and WI2 perform the same functions as the two cell stacks 112-1 and 112-2, the third, fourth, 5-$1^{st}$ and 5-$2^{nd}$ heaters H3, H4, H51 and H52, the terminal block 114A, the positive bus bar BP, the negative bus bar BN, the positive wire WP, the negative wire WN, the intermediate bus bar BI, and the intermediate wires WI1 and WI2 according to the above-described embodiments, respectively, and thus a duplicate description thereof will be omitted.

In addition, the junction box 20 includes a first switching unit 22. Since the first switching unit 22 performs the same function as the first switching unit 122 according to the above-described embodiment, a duplicate description thereof will be omitted.

Figure 15A:
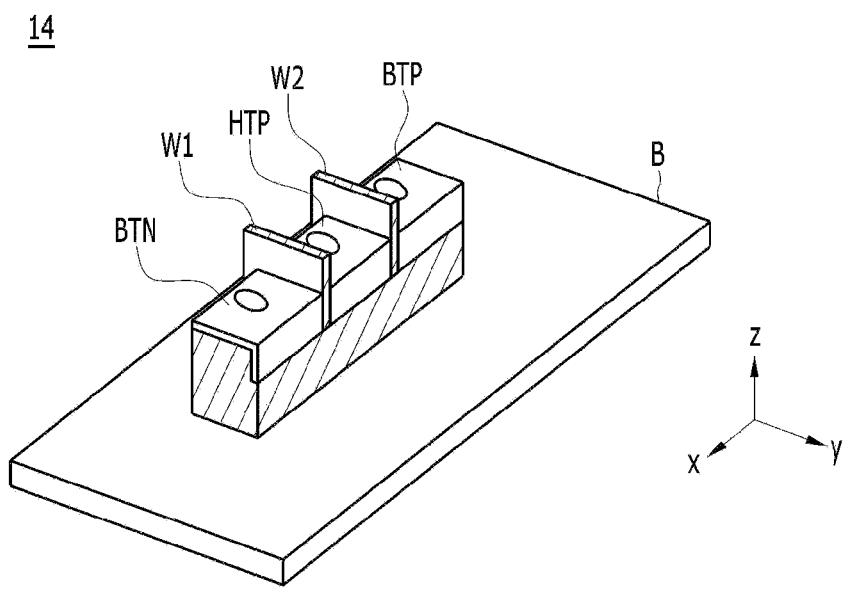
FIGS. 15A and 15B are respectively a perspective view and a plan view of the terminal block shown in FIG. 14.
Figure 15B:
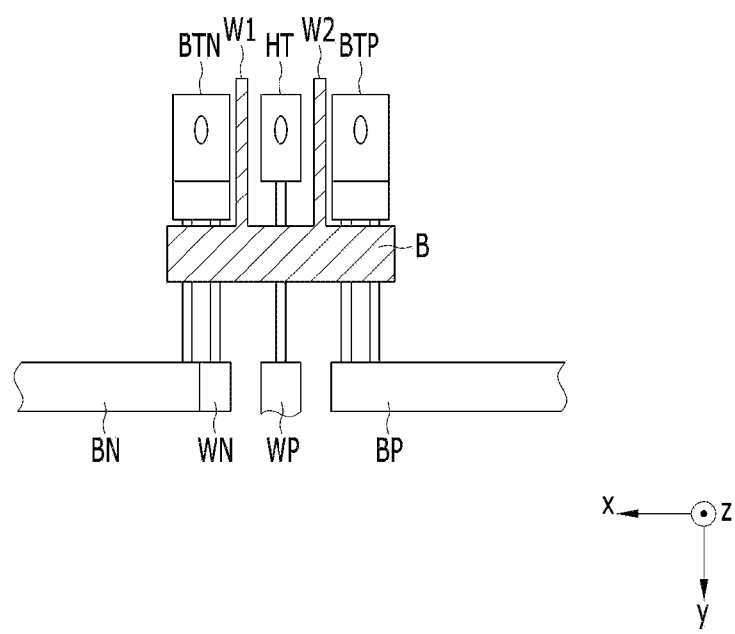

FIGS. 15A and 15B are respectively a perspective view and a plan view of the terminal block 14 shown in FIG. 14.

The terminal block 14 according to the comparative example includes a body B, partition walls W1 and W2, a positive bus terminal BTP, a negative bus terminal BTN, and a positive heater terminal HTP. The body B, the partition walls W1 and W2, the positive bus terminal BTP, the negative bus terminal BTN, and the positive heater terminal HTP perform the same functions as the bodies BA and BB, the partition wall W, the positive bus terminal BTP, the negative bus terminal BTN, and the positive heater terminal HTP shown in FIGS. 5A to 6B according to the embodiments, respectively, and thus a duplicate description thereof will be omitted.

The terminal block 114A or 114B according to the embodiment includes the negative heater terminal HTN, but the terminal block 14 according to the comparative example does not include a negative heater terminal HTN. According to the comparative example, as shown in FIG. 15B, a separate negative heater terminal HTN is not provided, and the negative wire WN and the negative bus bar BN are connected in common to the negative bus terminal BTN.

In addition, the junction box 120 according to the embodiment includes the first and second switching units 122 and 124, but the junction box 20 according to the comparative example includes only the first switching unit 22.

In the fuel cell vehicles 10 and 100A to 100D according to the comparative example and the embodiments, when the heater overheats due to an electrical problem, the first switch 22 or 122 is switched off to interrupt the supply of current to the heater.

Hereinafter, the switching operations of the switching units 122, 124, 130A and 130B included in the fuel cell vehicles 100A, 100B, 100C and 100D according to the above-described embodiments and the switching operation of the first switching unit 22 of the fuel cell vehicle 10 according to the comparative example will be compared with reference to the accompanying drawings.

In each of the first and second end cell heater assemblies 160A and 160B shown in FIG. 3, the male and female heater connectors 182 and 184 may be short-circuited, rather than being electrically isolated from the current collector 170, for various reasons such as, for example, damage to the insulating pad 166-2 shown in FIG. 4B, liquefaction of vapor present in the space in which the male and female heater connectors 182 and 184 are provided, tearing of the heater 168, which performs an insulating function, or collection of moisture at the point at which the insulating pad 166-2 is located.

In the portion indicated by 'A' in FIG. 2, when the male and female heater connectors 182 and 184 are short-circuited with the second current collector in the first circuit for causing the second heater H2 to generate heat, a closed loop may be formed, whereby the second heater H2 may continue to generate heat and may burn regardless of the switching operation of the first switching unit 122. In this case, according to the embodiment, the second switching unit 124 is switched off in order to stop heat generation by the second heater H2, thereby preventing burning of the second heater H2.

In the portion indicated by 'B' in FIG. 14, when the male and female heater connectors 182 and 184 are short-circuited with the 5-$1^{st}$ current collector in the first circuit for causing the 5-$1^{st}$ heater H51 to generate heat, a closed loop may be formed, whereby the 5-$1^{st}$ heater H51 may continue to generate heat and may burn regardless of the switching operation of the first switching unit 22. That is, even though the first switching unit 22 is switched off, it is not possible to prevent overheating of the 5-$1^{st}$ heater H51. On the other hand, according to the embodiment, in the portion indicated by C1 in FIG. 10, when the male and female heater connectors 182 and 184 are short-circuited with the 5-$1^{st}$ current collector in the first circuit for causing the 5-$1^{st}$ heater H51 to generate heat, a closed loop may be formed, and thus the 5-$1^{st}$ heater H51 may continue to generate heat regardless of the switching operation of the first switching unit 122. In order to prevent this, the second switching unit 124 is switched off so that a closed circuit causing the 5-$1^{st}$ heater H51 to generate heat is not formed, thereby stopping the heat generation by the 5-$1^{st}$ heater H51 and preventing burning of the 5-$1^{st}$ heater H51. In the portion indicated by C2 in FIG. 10, when the male and female heater connectors 182 and 184 are short-circuited with the fourth current collector in the first circuit for causing the fourth heater H4 to generate heat, a closed loop may be formed, and thus the fourth heater H4 may continue to generate heat regardless of the switching operation of the second switching unit 124. In order to prevent this, the first switching unit 122 is switched off so that a closed circuit causing the fourth heater H4 to generate heat is not formed, thereby stopping the heat generation by the fourth heater H4 and preventing burning of the fourth heater H4.

In the portion indicated by 'D' in FIG. 8, the male and female heater connectors 182 and 184 may be short-circuited with the second current collector in the first circuit for causing the second heater H2 to generate heat. In the portion indicated by 'E' in FIG. 8, the male and female heater connectors 182 and 184 may be short-circuited with the first current collector in the first circuit for causing the first heater H1 to generate heat. In this case, a closed loop may be formed, and thus both the first and second heaters H1 and H2 may continue to generate heat regardless of the switching operation of the first and second switching units 122 and 124. At this time, the third switching unit 130A is switched off so that a closed circuit causing the first and second heaters H1 and H2 to generate heat is not formed, thereby stopping the heat generation by the first and second heaters H1 and H2 and preventing burning of the first and second heaters H1 and H2.

In some of the plurality of portions indicated by 'F', 'G', 'H' and 'I' in FIG. 12, the male and female heater connectors 182 and 184 may be short-circuited with the current collector in the first circuit. In this case, a closed loop may be formed, and thus the heater connected to the short-circuited portion may continue to generate heat regardless of the switching operation of the first and second switching units 122 and 124. In order to prevent this, a corresponding one of the fourth, fifth and sixth switching units 132, 134 and 136 is switched off so that a closed circuit causing the heater to generate heat is not formed, thereby preventing burning of the heater. For example, in the portion indicated by 'G' in FIG. 12, the male and female heater connectors 182 and 184 may be short-circuited with the 5-$2^{nd}$ current collector in the first circuit for causing the 5-$2^{nd}$ heater H52 to generate heat, and in the portion indicated by 'I' in FIG. 12, the male and female heater connectors 182 and 184 may be short-circuited with the 5-$1^{st}$ current collector in the first circuit for causing the 5-$1^{st}$ heater H51 to generate heat. In this case, a closed loop may be formed, and thus both the 5-$1^{st}$ and 5-$2^{nd}$ heaters H51 and H52 may continue to generate heat regardless of the switching operation of the first and second switching units 122 and 124. At this time, the sixth switching unit 136 is switched off so that a closed circuit causing the 5-$1^{st}$ and 5-$2^{nd}$ heaters H51 and H52 to generate heat is not formed, thereby stopping the heat generation by the 5-$1^{st}$ and 5-$2^{nd}$ heaters H51 and H52 and preventing burning of the 5-$1^{st}$ and 5-$2^{nd}$ heaters H51 and H52.

As described above, the fuel cell vehicles 100A, 100B, 100C and 100D according to the embodiments may stop heat generation by the heaters using the second to sixth switching units 124, 130A, 132, 134 and 136 in the event of electrical malfunction thereof such as, for example, short-circuit of the first circuit and the second circuit, thereby increasing electrical stability.

As is apparent from the above description, according to a fuel cell vehicle of the embodiment, heat generation by a heater may be stopped in the event of electrical malfunction attributable to a short-circuit between a current collector and a part causing the heater to generate heat, thereby increasing electrical stability.

However, the effects achievable through the disclosure are not limited to the above-mentioned effects, and other effects not mentioned herein will be clearly understood by those skilled in the art from the above description.

The above-described various embodiments may be combined with each other without departing from the objects of the present disclosure unless they are incompatible with each other.

In addition, for any element that is not described in detail in any of the various embodiments, reference may be made to the description of an element having the same reference numeral in another embodiment.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell vehicle, comprising:
   a fuel cell; and
   a junction box coupled to the fuel cell to receive electric power generated in the fuel cell;
   wherein the fuel cell comprises:
      at least one cell stack including a plurality of unit cells in a stacked configuration;
      heaters disposed at end portions of the at least one cell stack and configured to heat the at least one cell stack;
      current collectors disposed at the end portions of the at least one cell stack and configured to collect electric power generated in the at least one cell stack;
      a terminal block electrically connecting the current collectors and the heaters to the junction box;
      a positive bus bar and a negative bus bar electrically connecting the current collectors to the terminal block; and
      a positive wire and a negative wire electrically connecting the heaters to the terminal block; and
   wherein the junction box comprises:
      a first switching unit disposed between the positive wire and the positive bus bar; and
      a second switching unit disposed between the negative wire and the negative bus bar.

2. The fuel cell vehicle according to claim 1, wherein the terminal block comprises:
   a positive bus terminal connecting the positive bus bar to a first end portion of the first switching unit;
   a positive heater terminal connecting the positive wire to a second end portion of the first switching unit, the second end portion being opposite the first end portion;
   a negative bus terminal connecting the negative bus bar to a third end portion of the second switching unit; and
   a negative heater terminal connecting the negative wire to a fourth end portion of the second switching unit, the fourth end portion being opposite the third end portion.

3. The fuel cell vehicle according to claim 2, wherein the first switching unit comprises:
   a first fuse having a first side connected to the first end portion; and
   a first switch disposed between a second, opposite side of the first fuse and the second end portion.

4. The fuel cell vehicle according to claim 2, wherein the second switching unit comprises:
   a second fuse having a first side connected to the third end portion; and
   a second switch disposed between a second, opposite side of the second fuse and the fourth end portion.

5. The fuel cell vehicle according to claim 2, wherein:
   the positive bus terminal and the negative bus terminal are aligned in a first direction; and
   the positive heater terminal and the negative heater terminal are aligned in a direction parallel to the first direction.

6. The fuel cell vehicle according to claim 2, wherein:
   one of the positive bus terminal and the negative bus terminal and one of the positive heater terminal and the negative heater terminal are aligned in a first direction; and
   a remaining one of the positive bus terminal and the negative bus terminal and a remaining one of the positive heater terminal and the negative heater terminal are aligned in a direction parallel to the first direction.

7. The fuel cell vehicle according to claim 1, wherein the heaters comprise:
   a first heater disposed at one of the end portions of the cell stack so as to be connected to one of the positive wire and the negative wire; and a second heater disposed at an opposite one of the end portions of the cell stack so as to be connected to a remaining one of the positive wire and the negative wire.

8. The fuel cell vehicle according to claim 7, wherein the fuel cell further comprises an intermediate wire disposed between the first heater and the second heater and configured to connect the first heater and the second heater.

9. The fuel cell vehicle according to claim 8, wherein the fuel cell further comprises a third switching unit disposed in a path of the intermediate wire between the first heater and the second heater.

10. The fuel cell vehicle according to claim 9, wherein the third switching unit comprises:
   a third fuse having a first side connected to one of the first heater and the second heater; and
   a third switch disposed between a second, opposite side of the third fuse and a remaining one of the first heater and the second heater.

11. A fuel cell vehicle, comprising:
   a fuel cell; and
   a junction box configured to receive electric power generated in the fuel cell;
   wherein the fuel cell comprises:
      a plurality of cell stacks electrically connected to each other, each cell stack including a plurality of unit cells in a stacked configuration;
      heaters disposed at end portions of each of the plurality of cell stacks and configured to heat each of the plurality of cell stacks, respectively;
      current collectors disposed at the end portions of each of the plurality of cell stacks and configured to collect electric power generated in each of the plurality of cell stacks, respectively;
      a terminal block electrically connecting the current collectors and the heaters to the junction box;
      a positive bus bar and a negative bus bar electrically connecting the current collectors to the terminal block; and
      a positive wire and a negative wire electrically connecting the heaters to the terminal block; and
   wherein the junction box comprises:
      a first switching unit disposed between the positive wire and the positive bus bar; and
      a second switching unit disposed between the negative wire and the negative bus bar.

12. The fuel cell vehicle according to claim 11, wherein the fuel cell further comprises:
   an intermediate bus bar disposed between the plurality of cell stacks to electrically connect the plurality of cell stacks to each other; and
   an intermediate wire disposed between the plurality of cell stacks to electrically connect the heaters of the plurality of cell stacks to each other.

13. The fuel cell vehicle according to claim 12, wherein the heaters comprise:
   a third heater connected to the positive wire;
   a fourth heater connected to the negative wire; and
   a plurality of fifth heaters disposed between the third heater and the fourth heater.

14. The fuel cell vehicle according to claim 13, wherein the intermediate wire comprises:
   a first intermediate wire connecting the third heater and a $5\text{-}1^{st}$ heater, the $5\text{-}1^{st}$ heater being one of the plurality of fifth heaters;
   a second intermediate wire connecting the fourth heater and a $5\text{-}2^{nd}$ heater, the $5\text{-}2^{nd}$ heater being another one of the plurality of fifth heaters; and
   a third intermediate wire connecting the plurality of fifth heaters to each other.

15. The fuel cell vehicle according to claim 14, wherein the fuel cell further comprises:
   a fourth switching unit disposed in a path of the first intermediate wire;
   a fifth switching unit disposed in a path of the second intermediate wire; and
   a sixth switching unit disposed in a path of the third intermediate wire.

16. The fuel cell vehicle according to claim 15, wherein the fourth switching unit comprises:
   a fourth fuse having a first side connected to the $5\text{-}1^{st}$ heater; and
   a fourth switch disposed between a second, opposite side of the fourth fuse and the third heater.

17. The fuel cell vehicle according to claim 15, wherein the fifth switching unit comprises:
   a fifth fuse having a first side connected to the fourth heater; and
   a fifth switch disposed between a second, opposite side of the fifth fuse and the $5\text{-}2^{nd}$ heater.

18. The fuel cell vehicle according to claim 15, wherein the sixth switching unit comprises:
   a sixth fuse having a first side connected to one of the $5\text{-}1^{st}$ heater and the $5\text{-}2^{nd}$ heater; and
   a sixth switch disposed between a second, opposite side of the sixth fuse and a remaining one of the $5\text{-}1^{st}$ heater and the $5\text{-}2^{nd}$ heater.

* * * * *